T. E. MURRAY.
ELECTRIC CUT-OUT.
APPLICATION FILED JAN. 24, 1917.

1,363,151.

Patented Dec. 21, 1920.
2 SHEETS—SHEET 1.

INVENTOR
Thomas E. Murray
BY
ATTORNEY

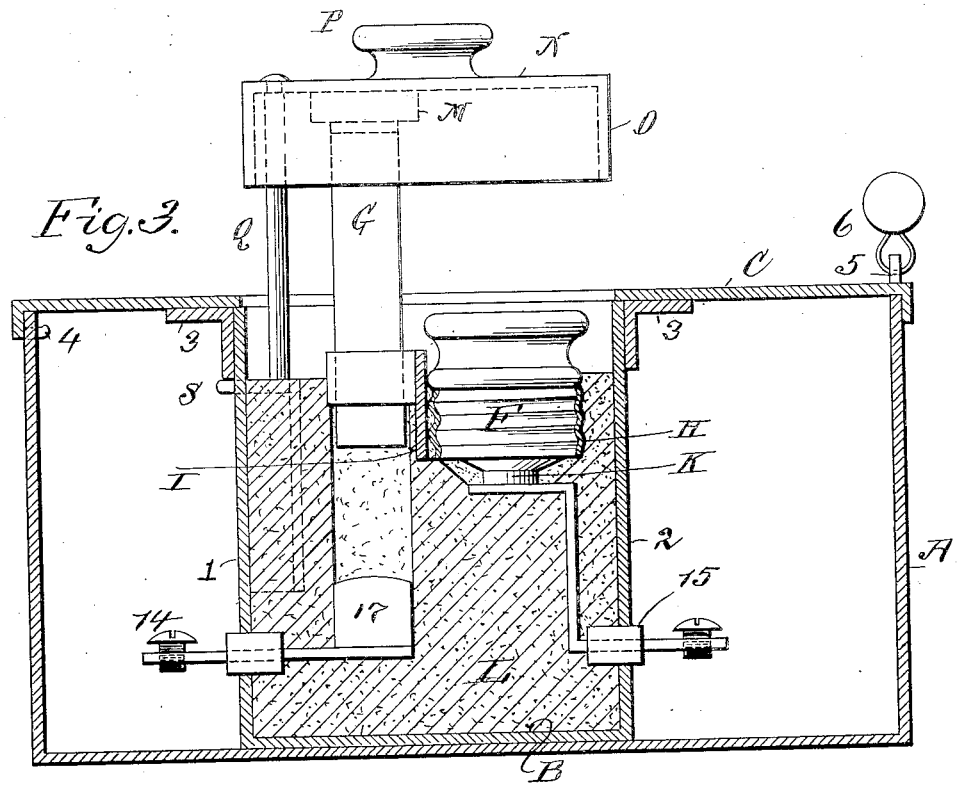
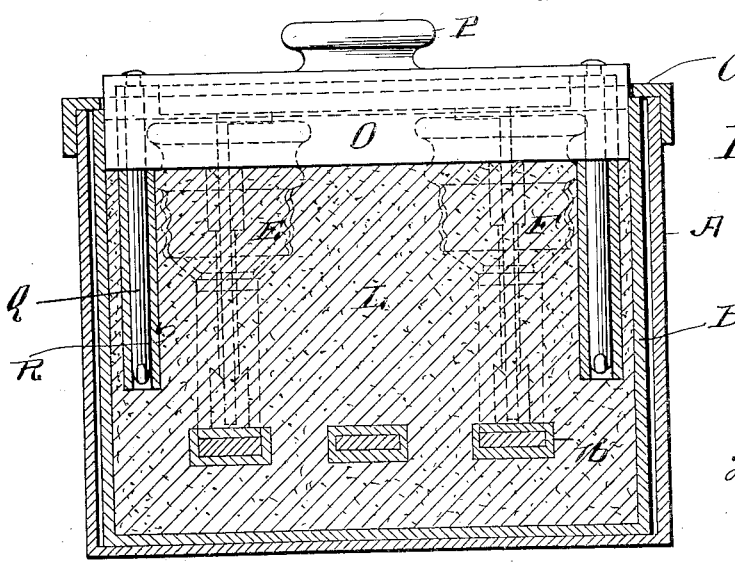

UNITED STATES PATENT OFFICE.

THOMAS E. MURRAY, OF NEW YORK, N. Y.

ELECTRIC CUT-OUT.

1,363,151.     Specification of Letters Patent.     Patented Dec. 21, 1920.

Application filed January 24, 1917. Serial No. 144,136.

*To all whom it may concern:*

Be it known that I, THOMAS E. MURRAY, a citizen of the United States, residing at New York, in the county of New York and State of New York, have invented a certain new and useful Improvement in Electric Cut-Outs, of which the following is a specification.

The invention relates to electric cut-outs, and consists in the construction hereinafter set forth, whereby the user is guarded from injury from live parts when the box is opened, and at the same time, access cannot be had to terminals, from which current may be purloined.

In the accompanying drawings—

Figure 1:
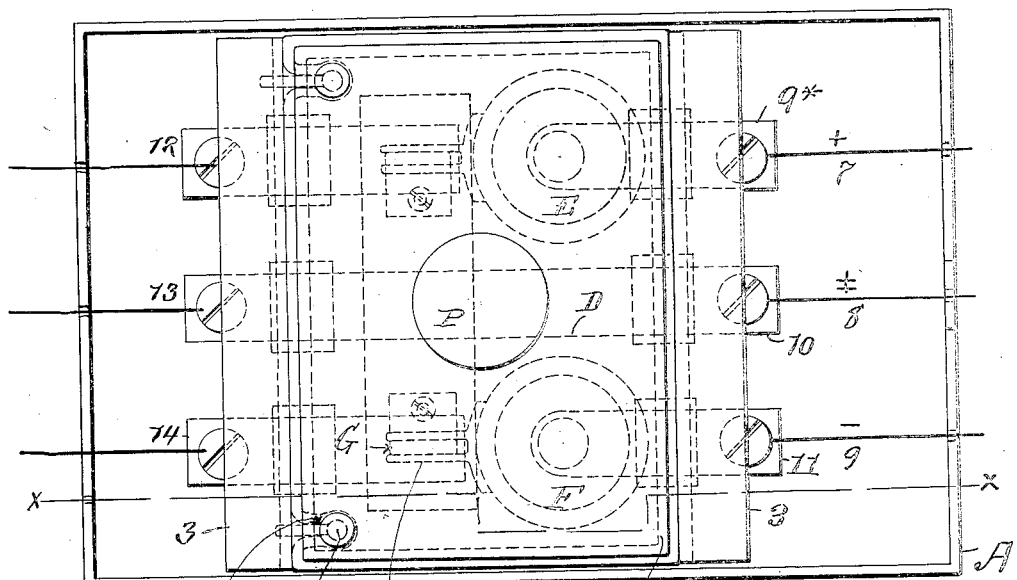
Figure 2:
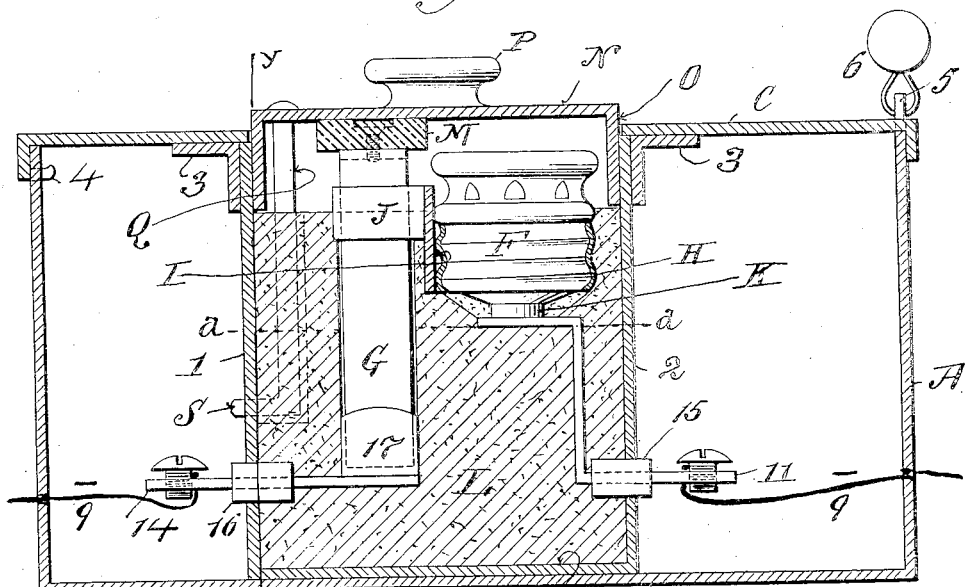

Figure 1 is a plan view of my cut-out, the cover C being removed. Fig. 2 is a section on the line $x, x$ of Fig. 1, showing the cut-out switch in circuit closing position. Fig. 3 is a similar section, showing said switch raised to break the circuit. Fig. 4 is a transverse section on the line $y, y$ of Fig. 2.

Similar letters and numbers of reference indicate like parts.

A is the inclosing box of sheet metal. B is a smaller box of sheet metal within box A. On the opposite walls 1, 2 of box B are two flanges 3, here angle bars electrically welded to said walls. Said flanges are flush with the upper edges of walls 1, 2. The box A has a downwardly flanged cover C which rests upon flanges 3. On one end flange of said cover is a projection 4 which enters an opening in the wall of box A. On the opposite wall of box A is an upwardly projecting lug 5 which passes through an aperture in said cover and has an opening to receive the shackle of a seal fastening 6, whereby said cover is locked in place on said box.

My cut-out, as shown in the drawings, is adapted to a three-wire system, of which 7 is the positive, 8 the neutral, and 9 the negative leads. These leads pass through openings in the end walls of box A, and are connected to the terminals 9*, 10, 11 and 12, 13, 14. The neutral terminals 10, 13 are connected by a metal strip D. Between the terminals 9*, 12 and 11, 14 are interposed the two fuse plugs E, F and the cut-out switches and associated parts about to be described. As the switches and parts associated with fuse plug E are like those associated with fuse plug F, a description of the switch and parts associated with one fuse plug applies to both.

The terminal 11, preferably a strip of copper, enters box B through a sleeve 15 of insulating material in wall 2, and is bent first vertically upward, and then horizontally. The similar terminal 14 enters box B through a sleeve 16 of insulating material in wall 1, and carries a pair 17 of vertical contact clips. After the terminals 11 and 14 are in place in box B, as described, I place in the clips 17 a strip of wood or metal precisely similar to the vertical switch bar G, the object of this strip being merely to serve as a core in the subsequent molding operation. I then pour into box B any plastic insulating material which will harden—preferably plaster of Paris tempered to a liquid with water—and fill the box B up to the bottom surface of the horizontal bend of terminal 11, indicated by the line $a, a$. I then place upon the screw fuse plug F a threaded metal sleeve H, to which is soldered a bar I which carries a pair of metal contacts J. I place the contacts J upon the core already described, and rest the lower contact button K of the fuse plug F upon the terminal 11. The parts remaining in this position, I pour in more liquid plaster until the threaded sleeve K is covered, as shown in Fig. 1, and the contacts J are partially embedded. When all the plaster has hardened, as shown at L, I draw out the core, so that a free vertical channel is left in the plaster, at the ends of which are the contacts J and the contact clip 17.

Into this channel I insert the vertical metal switch bar G, which fits between contacts J, and which at its lower end enters the clip 17. Said bar at its upper end is secured to a block M of insulating material, and this block is attached to the under side of a rectangular cover N. The cover N has a flange O on all four edges, which flange enters an opening in cover C, so that when in place, the lower edge of flange O rests upon the plaster L in box B, as shown in Fig. 2. At this time, circuit is completed from terminal 11, to fuse plug F, threaded sleeve H, contacts J, vertical switch bar G, and so to terminal 14.

On the cover N is a handle P, and depending from said cover are two rods Q which are received in guide recesses R formed by inwardly bending the wall 1 of box B—see Figs. 1 and 4. The lower ends S of these rods are turned outwardly. Hence when the cover N is raised by its handle P from the position of Fig. 2 to the position of Fig. 3, said ends S strike the lower edges of the angle bars, which form flanges 3, and thus the removal of the cover N and switch bar G from the box B is prevented.

The relation of the vertical depths of the flange O and of the contact clip 17 is preferably such that the lower end of switch bar G leaves the clip 17, and so breaks circuit before the lower edge of cover flange O clears the edge of the opening in cover A, and therefore the vertical depth of flange O is made greater than the vertical depth of clip 17.

When the cover N is raised to the limit imposed by its above described stop, and circuit is broken at clip 17, the operator may insert his hand to grasp fuse plug F in order to replace the same without fear of contact with any live part. Nor is it possible to obtain access to such live parts for the purpose of stealing current, since even if the removal of plug F allows access to the terminal 11, the constant presence of the switch bar G in the channel above the clip 17, effectually prevents any reaching of said clip.

I claim:

1. A cut-out, comprising a box, a removable cover therefor, a switch bar secured at one end to and depending from said cover, two separated contacts, one coöperating with the body and the other with the free end of said bar, and means for limiting the outward movement of said switch bar.

2. A cut-out, comprising a box, a removable cover therefor having flanges received in said box, a switch bar secured at one end to and depending from said cover, a pair of contacts receiving between them the body portion of said bar, and a pair of contacts receiving between them the free end of said bar and of less depth than said cover flanges.

3. A cut-out, comprising an outer box, an inner box, circuit leads entering through the walls of said outer box and connected to circuit terminals on said inner box, a cover for said outer box having an opening, a removable cover for said inner box disposed in said opening, and, within said inner box and connected to said circuit terminals, a switch mechanism in circuit and connected to and operated by the lifting of said removable cover.

In testimony whereof I have affixed my signature in presence of two witnesses.

THOMAS E. MURRAY.

Witnesses:
GERTRUDE T. PORTER,
MAY T. McGARRY.